United States Patent [19]
Nelham

[11] 4,244,158
[45] Jan. 13, 1981

[54] PACKAGE FORMING METHOD AND APPARATUS

[75] Inventor: Roy W. Nelham, Cheltenham, Canada

[73] Assignee: R. Nelham & Associates Incorporated, Mississauga, Canada

[21] Appl. No.: 20,078

[22] Filed: Mar. 13, 1979

[51] Int. Cl.³ .................... B65B 9/02; B65B 61/18
[52] U.S. Cl. ........................ 53/412; 53/450; 53/133; 53/550; 53/555; 53/202; 426/120; 426/410
[58] Field of Search ............ 53/450, 550, 553, 555, 53/412, 133, 202; 156/290, 582, 583.4; 426/119, 120, 123, 128, 130, 115, 410; 206/216, 631, 632, 633, 634; 229/485 B, 56, 72

[56] References Cited
U.S. PATENT DOCUMENTS

| | | | |
|---|---|---|---|
| 2,563,071 | 8/1951 | Salfisberg | 53/450 |
| 2,608,405 | 8/1952 | Salfisberg et al. | 53/555 X |
| 2,673,430 | 3/1954 | Fleischer et al. | 53/202 X |
| 2,828,590 | 4/1958 | Swartz et al. | 53/553 X |
| 3,140,572 | 7/1964 | Petersen et al. | 53/450 X |
| 3,383,269 | 5/1968 | Kopp | 53/555 X |
| 3,508,378 | 4/1970 | Fehr et al. | 53/553 |
| 3,943,686 | 3/1976 | Crawford et al. | 53/550 X |
| 3,983,994 | 10/1976 | Wyslotsky | 426/120 X |
| 4,094,236 | 6/1978 | Nelham | 221/297 X |

*Primary Examiner*—John Sipos
*Attorney, Agent, or Firm*—Sim & McBurney

[57] ABSTRACT

Ice cream sandwich packages, containing an ice cream block and two wafers in separate adjacent compartments of a flat flexible polymeric material wrapper comprised of overlying layers of material heat sealed together at the marginal edges thereof, to separate the two compartments and at each end thereof, are continuously formed in apparatus consisting of rotary sealing elements to seal films together around the items to be packaged and rotary cutting elements to separate individual packages.

7 Claims, 9 Drawing Figures

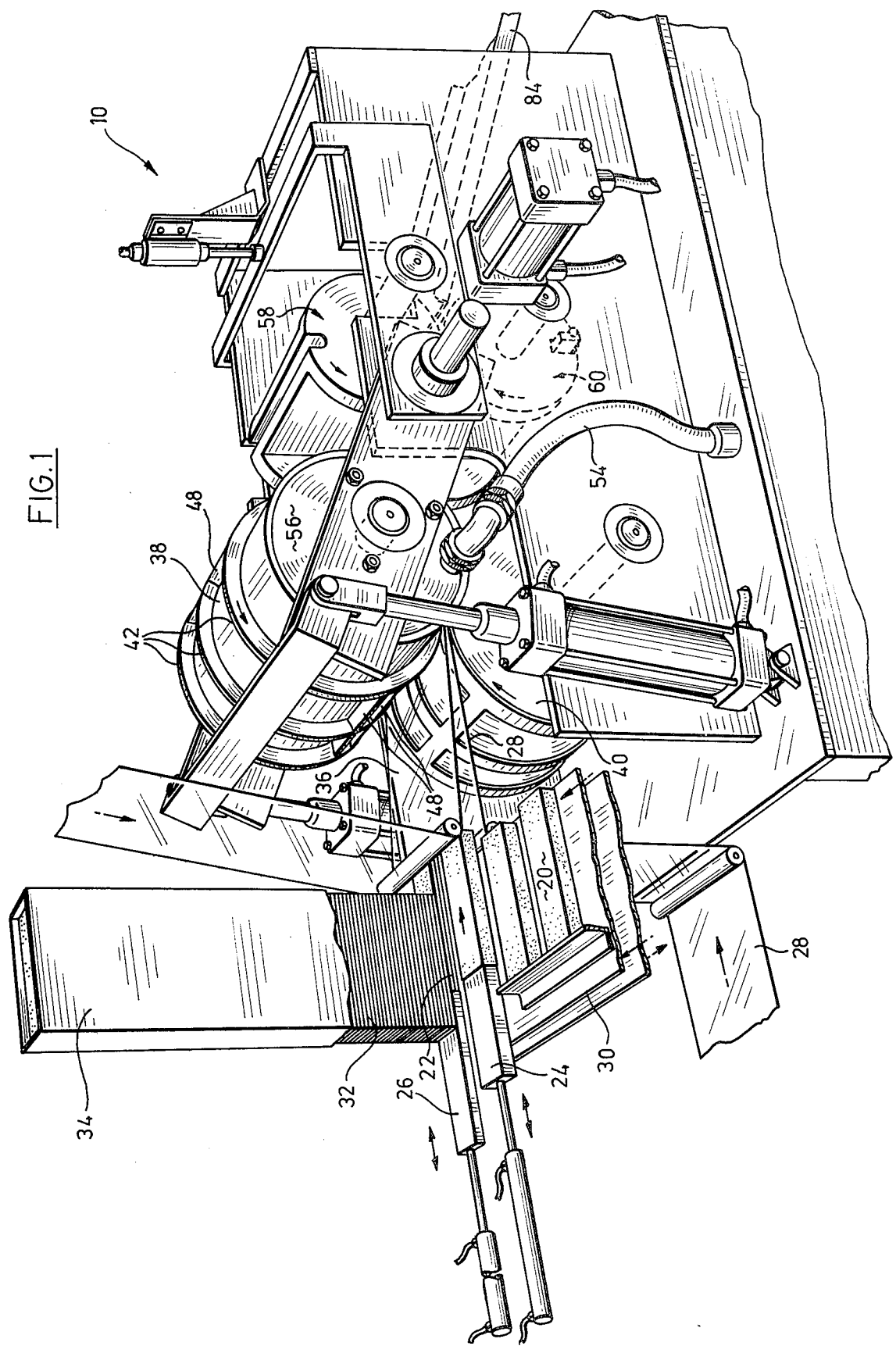

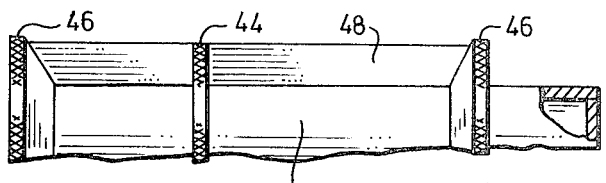
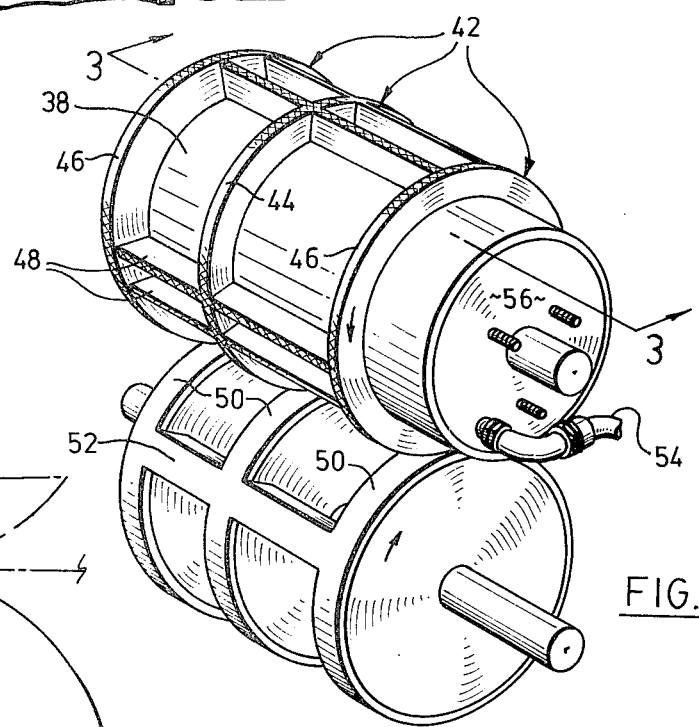
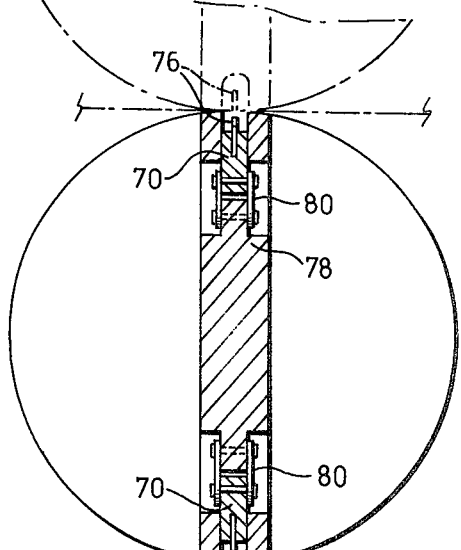
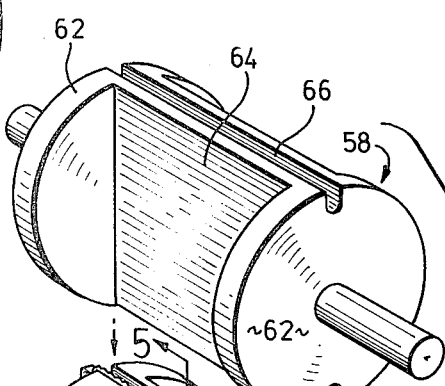
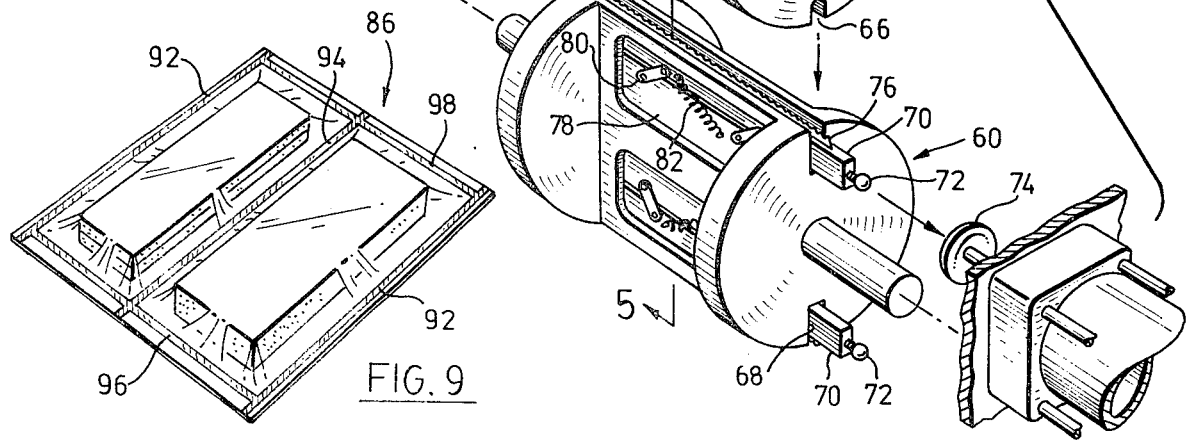

PACKAGE FORMING METHOD AND APPARATUS

FIELD OF INVENTION

The present invention relates to method and apparatus for forming packages.

BACKGROUND TO THE INVENTION

In our U.S. Pat. No. 4,145,449 there is described and claimed a pouch-like packaging structure wherein overlying layers of flexible polymeric material are heat sealed along the side edges to provide permanent seals thereat, along the top and bottom edges to provide a temporary or pealable seal at at least the top edge, and between the side edges extending from the top to the bottom edge to provide a temporary or pealable seal thereat separating the interior of the package into two separate compartments. The separate compartments enable two food or other materials which can adversely affect each other if stored in the same compartment to be stored in the same package. The specific embodiment of such food materials as outlined in the prior patent are the components of an ice cream sandwich, comprised of an ice cream block, packaged in one compartment, and frangible wafer biscuits, packaged in the other compartment. The pealable seals permit the package to be opened along the top edge seal and the compartment separating seal, to provide ready access to the contents of the compartments and the formation of a single compartment open at the top edge.

SUMMARY OF INVENTION

The present invention provides method and apparatus for the continuous production of the packages of the prior patent.

In the present invention, materials to be packaged are serially placed between upper and lower substantially horizontally moving heat sealable films, heat seals are formed between the overlying films to define the heat seals of the package and packages are severed one from another.

BRIEF DESCRIPTION OF DRAWINGS

FIG. 1 is a perspective view of an apparatus for continuous production of ice cream sandwich packages in accordance with one embodiment of the invention;

FIG. 2 is a detail perspective view of the sealing rollers used in the apparatus of FIG. 1;

FIG. 3 is a sectional view taken along line 3—3 of FIG. 2;

FIG. 4 is a detail exploded perspective view of the cutter rollers used in the apparatus of FIG. 1;

FIG. 5 is a sectional view taken on line 5—5 of FIG. 4;

FIG. 9 is a perspective view of the completed package.

DESCRIPTION OF PREFERRED EMBODIMENTS

Figure 6:
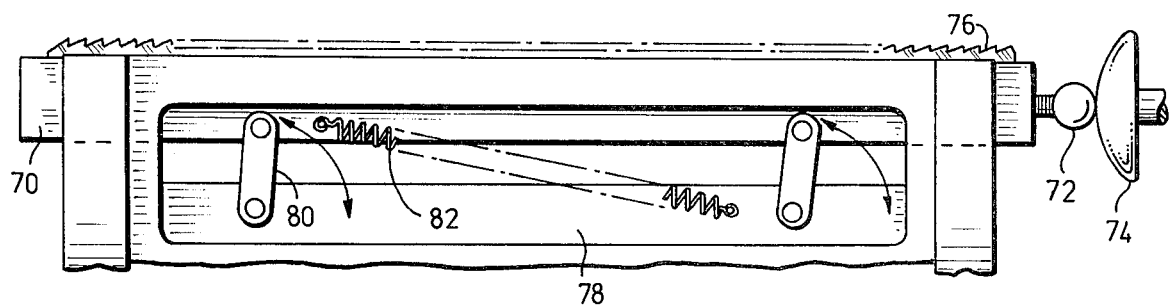
FIG. 6 is a detail side view of the lower member of the cutter rollers used in the apparatus of FIG. 1.
Figure 7:
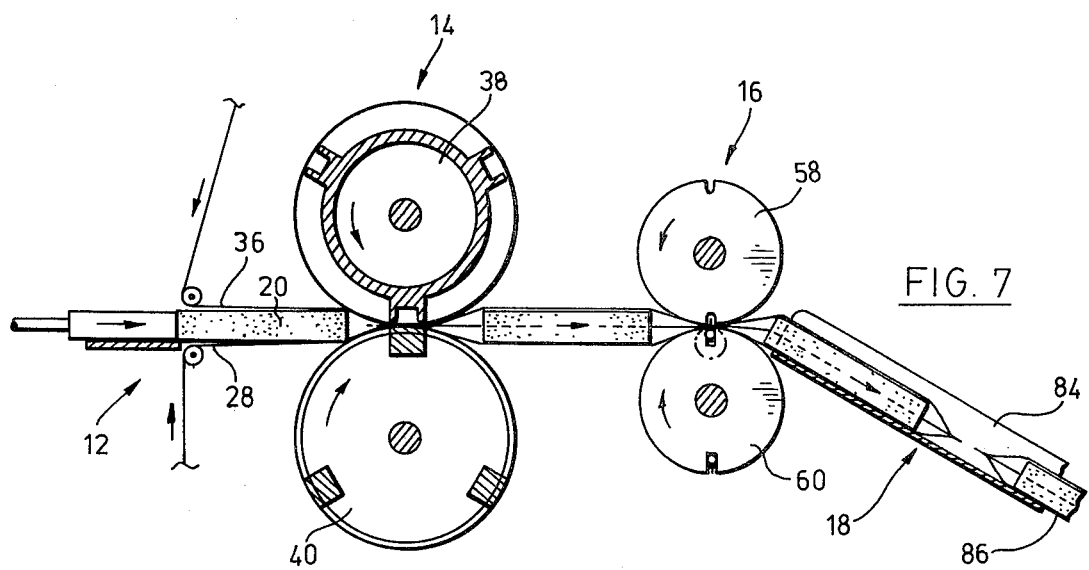
FIG. 7 is a diagrammatic view of the apparatus of FIG. 1 illustrating the continuous formation of the packages and severing of the individual packages.

Referring to the drawings, a packaging apparatus 10 comprises a feeding and assembly station 12, a sealing station 14, a cutting station 16 and a discharge station 18. At the feeding and assembly station 12, ice cream blocks 20 and pairs of frangible wafers 22 are simultaneously advanced by reciprocating pistons 24 and 26 respectively onto the top surface of a lower horizontal moving band 28 of heat sealable flexible polymeric film, such as, polyethylene or polyethylene coated paper, fed from a supply reel (not shown).

The ice cream blocks 20 are forwarded on a conveyor surface 30 in spaced relation to the position for movement by the piston 24. The wafers 22 are fed downwardly from a stack 32 housed within a chute 34.

An upper moving band 36 of heat sealable flexible polymeric material, is fed from a supply reel (not shown) to overly the lower band 28 and the ice cream block 20 and the wafers 24 at the feeding and assembly station 12.

The sealing station 14 consists of upper and lower rollers 38 and 40. The roller 38 has radially-extending circumferentially-directed heat sealing elements 42 located one at each axial end of the roller 38 and the third one located between these two elements. The heater elements 42 usually are constructed of metal with knurled outer surfaces. The central one 44 of the three radial heat sealing elements 42 extends for a radial distance less than the outer ones 46 of the radial heat sealing elements 42, as may be seen from the detail view in FIG. 3.

The roller 38 also includes axially-directed circumferentially-spaced pairs 48 of heat sealing elements extending continuously the length of the roller 38 between the outer radial heat sealing elements 46 and extending for the height of the heating element 44. In the illustrated embodiment there are three circumferentially spaced pairs 48 of heat sealing elements, permitting three packages to be sealed for each revolution of the roller 38.

The roller 48 has surface projections which act as backing members for the heat sealing elements of the roller 38 and are generally formed of rubber or the like. Three circumferentially-directed backing elements 50 correspond to and cooperate with the heat sealing elements 42 and three circumferentially-spaced axially-directed backing elements 52 correspond to and cooperate with the heat sealing element pairs 48.

The dimensioning of the heat sealing elements and the backing elements permits the ice cream block 20 and the wafers 22 to pass between the nip of the rollers 38 and 40. The upper roller 38 is biased downwardly on the lower roller 40 to ensure proper sealing of the overlying layers of polymeric film at the sealing station 14 and positive drive of the polymeric films through the sealing station 14. The sealing surfaces of the roller 38 are heated electrically with electrical feed being provided by a flexible cable 54, through fixed slip ring plate 56.

At the cutting station 16 there are provided a pair of rollers 58 and 60 which cooperate to cut sealed polymeric film passing therebetween at predetermined longitudinally-spaced positions. The upper roller 58 is downwardly biased against the roller 60 to ensure positive drive through the cutting station 16 and has circumferentially-extending radial end walls 62, planar parallel recessed surfaces 64 and radially-directed elongate recessed cutter blade-receiving channels 66.

The lower roller 60 is similarly constructed to the upper roller 58 but has deeper recessed channels 68 each housing a radially-reciprocable cutter element 70. The cutter element 70 has a round head pin element 72 extending from one end to act as a cam follower element by engagement with round head cam element 74.

The cutter element 70 has a cutting blade 76 and is reciprocably mounted in the recess 68 by connecting it to and normally in engagement with an element 78 by plates 80, the element 78 being fixedly mounted to the roller 60. An expansion spring 82 also interconnects the cutter element 70 and the element 78 and biases the cutter element 70 into engagement with the element 78. Two cutter elements 70 are used, so that each revolution of the rollers 58 and 60 produces two cutting actions.

The discharge station includes a downwardly inclined chute 84 for gravity discharge of individual packages 86 from the machine 10.

Figure 8:
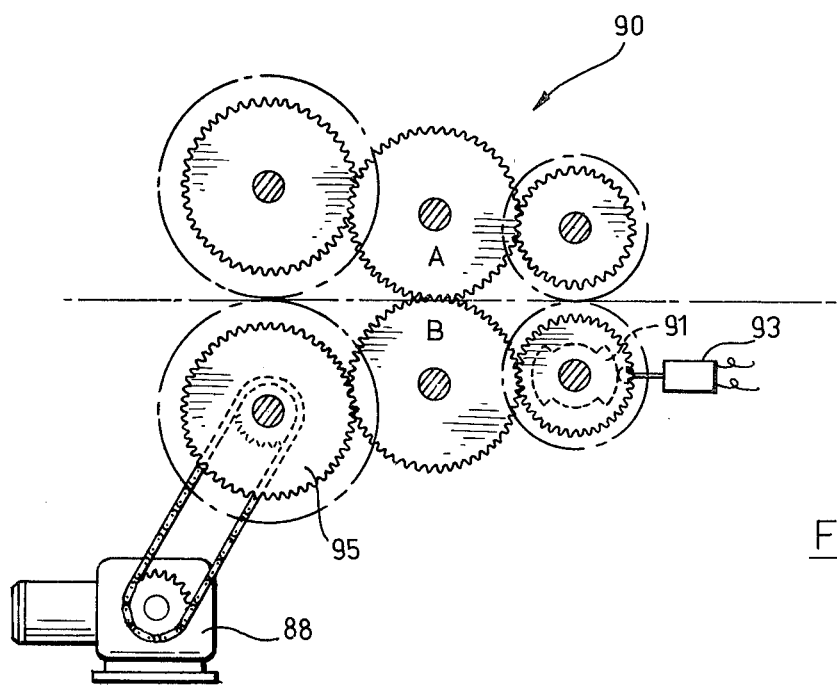
FIG. 8 is an elevational view of the drive train used in the apparatus of FIG. 1.

The drive mechanism for the unit is shown in FIG. 8 and includes a single drive motor 88 drivably connected to inter-meshed gear wheel train 90. The single drive motor 88 and inter-meshed gear train 90 ensures a uniform speed of action of feed, sealing, cutting and discharge. The gear train 90 also provides the desired gear ratio between the sealing rollers 38 and 40 and the cutting rollers 58 and 60 to take into account the different numbers of operations per revolution. The gear train 90 includes a cam 91 and switch 93 for activation of cam element 74.

OPERATION

The operation of the machine 10 now will be described with reference to the formation of one package 86. The procedure is continuous, however, and packages 86 are serially formed by repetition of the recited operations.

An ice cream block 20 and two wafers 22 are simultaneously forwarded by pushers 24 and 26 onto the lower band 28, conveyed thereon and engaged by the upper band 36. The lower and upper bands are pinched between the heating elements 46 of the roller 38 and the backing elements 80 of the roller 40 at the sealing station 14 at the marginal edges thereof to form permanent heat seals 92 thereat. At the same time, the recessed nature of the heating element 44 as compared with the heating elements 46 causes the formation of a pealable seal 94 between the films which separates the ice cream block 20 laterally from the wafers 22.

The overlying films 28, 36 are engaged by a sealing element pair 48, which also produce two pealable seals 96, 98 constituting respectively the rearward end seal of one package and the forward end seal of the immediately rearward package. In this way, the seal arrangement of my prior patent in the package and the results thereof are provided.

The radial projection of the sealing elements and the backing elements permits the ice cream block 20 and the wafers 22 to pass the rollers 38 and 40 without deformative engagement therewith.

The package so formed passes to the cutting station where, upon actuation of the cam 74 by switch 93 through suitable circuitry ahead of contact by the cam follower 72 and ride up of the cam follower 72 over the surface of the cam 74 cutter blade 76 is caused to move radially, pass through and sever the overlying films between the pealable seals formed by the pair of sealing elements 48 and into the recess 66 in roller 58, to separate the package 86 ahead from the package just formed. Upon release of the cam 74, the spring 82 retracts the cutter 76 into the recess 68. The package then passes the station 18 by virtue of the geometric shape of the cutting rollers 58 and 60 and is severed from the preceding package on the next cutting action. The separated package 86 then passes out of the machine 10 under the influence of gravity and the force of the next-formed package by chute 18.

The machine 10 in this way is able to produce ice cream packages of the type described in my earlier patent at any desired production rate. The number and location of the heating elements at the heating station may be varied to provide packaging structures having differing seal forms from those described and in different locations.

SUMMARY OF DISCLOSURE

The present invention, therefore, provides method and apparatus for rapidly and continuously manufacturing planar-like packages formed from sealed overlying polymeric films. Modifications are possible within the scope of the invention.

I claim:

1. A method of forming a packaging structure, which comprises:

feeding items to be packaged in pairs serially onto a substantially horizontally-moving band of heat sealable flexible polymeric material in accordance with the desired horizontal spacing on said band, and engaging said items with a parallely-moving upper band of heat sealable flexible polymeric material, continuously heat sealing said upper band to said horizontally-moving band at the marginal edges thereof to provide permanent longitudinal seals thereat and between said marginal edges to provide a longitudinal pealable seal thereat to separate said pair of items, intermittently heat sealing said upper band to said horizontally-moving band at longitudinally-spaced locations thereof to provide closely-spaced transverse pairs of pealable seals extending between said marginal edges, transversely severing the heat sealed layers between said closely spaced transverse pair of pealable seals to successively form individual heat sealed packages containing said pair of items, each said individual heat sealed packages thereby having permanent heat seals at each side edge thereof, pealable seals at each end thereof and an additional pealable seal extending continuously from the one end edge to the other to separate the interior of the package into separate compartments each containing one of said items, whereby, upon separation of the overlying layers along the pealable seal at one of said end edges, the overlying layers also separate along said additional pealable seal to permit simultaneous access to the items in the package and to form a single interior compartment without otherwise damaging the integrity of the remainder of the package.

2. The method of claim 1 wherein said pair of items comprises an ice cream block and a pair of ice cream wafers.

3. An apparatus for forming packaging structures, comprising:

feeding and loading station means comprising means for simultaneous feeding two separate items to be packaged side-by-side between generally horizontally-moving overlying films of heat sealable polymeric material, heat sealing station means comprising rotary heat sealing means and rotary backing means cooperating to heat seal said overlying films around said items and to form a continuous band of packages, said rotary heat sealing means comprising first radially-projecting continuously circumferentially-extending sealing elements spaced relative to each other and each located substantially at the axial extremities of said sealing means, a second radially-projecting continuously circumferentially-extending sealing element located between said first heating elements, and axially-extending circumferentially-spaced sealing elements constituted by circumferentially-spaced pairs of closely-spaced heating elements, said second sealing element and said axially-extending sealing element radially projecting to a lesser degree than said first sealing elements whereby said first sealing elements are capable of producing permanent heat seals at each side edge of the overlying films while said second sealing element and said axially-extending sealing element are capable of producing only pealable seals located at the longitudinal extremity of each package and extending between the longitudinal extremities to locate the separate items in separate internal compartments of the package, cutting station means including cutting elements for severing individual packages from said continuous band thereof, and discharge means for discharging from the apparatus said individual packages having permanent seals at each side edge thereof, pealable seals at each end edge thereof and an additional pealable seal extending continuously from one end edge to the other to separate the interior of the package into separate compartments each containing one of said side-by-side items, whereby, upon separation of the overlying layers along the pealable seal at one of said end edges, the overlying layers also separate along said additional pealable seal to permit simultaneous access to the items in the package and to form a single interior compartment without otherwise damaging the integrity of the remainder of the package.

4. The apparatus of claim 3 wherein said cutting elements comprise selectively-actuable radially-reciprocal knife means recessed in the surface of a rotating element.

5. The apparatus of claim 4 wherein said knife means is selectively actuable by cam means engaging cam follower means associated with said knife means, said knife means is biasingly received in said recess.

6. The apparatus of claim 3 wherein said cutting elements include upper and lower rotary elements engaging the peripheral edges of the heat sealed films, selectively-actuable and radially-reciprocal knife means biasingly located in diametrically opposed peripheral recesses in the surface of said lower rotary member, complimentary diametrically-opposed peripheral recesses in said upper rotary member, said knife means being selectively actuable by cam means engaging cam follower means on said knife means to cause the latter to extend radially out of the respective one of said recesses in said lower member into the adjacent one of said recesses of said upper rotary member against the biasing action of biasing means and permit the radially extended knife means to return to said respective recess under the action of said biasing means.

7. The apparatus of claim 6 including single drive means drivingly engaged with said rotary elements at said sealing station and at said cutting station whereby said rotary elements operate in unison, and said rotary elements at said sealing station and at said cutting station are arranged to drivingly engage the polymeric films therebetween.

* * * * *